US009459384B2

(12) United States Patent
Suzuki (10) Patent No.: US 9,459,384 B2
(45) Date of Patent: Oct. 4, 2016

(54) DIFFRACTION OPTICAL SYSTEM USING FREE CURVE SURFACE PRISM, AND IMAGE CAPTURING DEVICE

(75) Inventor: Kenzaburo Suzuki, Yokohama (JP)

(73) Assignee: Nikon Corporation, Tokyo (JP)

(*) Notice: Subject to any disclaimer, the term of this patent is extended or adjusted under 35 U.S.C. 154(b) by 152 days.

(21) Appl. No.: 13/982,788

(22) PCT Filed: Jan. 18, 2012

(86) PCT No.: PCT/JP2012/000256
§ 371 (c)(1),
(2), (4) Date: Jul. 31, 2013

(87) PCT Pub. No.: WO2012/108126
PCT Pub. Date: Aug. 16, 2012

(65) Prior Publication Data
US 2013/0308191 A1 Nov. 21, 2013

(30) Foreign Application Priority Data
Feb. 7, 2011 (JP) ................. 2011-024279

(51) Int. Cl.
*G02B 5/18* (2006.01)
*G02B 17/08* (2006.01)
(Continued)

(52) U.S. Cl.
CPC ............. *G02B 5/18* (2013.01); *G02B 17/086* (2013.01); *G02B 27/0037* (2013.01); *G02B 27/4211* (2013.01)

(58) Field of Classification Search
CPC .............. G02B 27/42; G02B 27/0056; G02B 27/0037; G02B 27/0025; G02B 27/0116; G02B 5/18; G02B 2027/0116; G02B 2027/0138; G02B 27/44

USPC ....... 359/558–576, 630, 631, 633, 637, 640, 359/833, 834
See application file for complete search history.

(56) References Cited

U.S. PATENT DOCUMENTS 5,768,025 A * 6/1998 Togino ................ G02B 17/08
359/630
2009/0153969 A1* 6/2009 Saito ........................ 359/576
(Continued)

FOREIGN PATENT DOCUMENTS

JP 3559624 B2 9/2004

OTHER PUBLICATIONS

Sultanova et al., "Dispersion Properties of Optical Polymer," Acta Physica Polonica A, vol. 116, No. 4, 2009, pp. 585-587.*
(Continued)

*Primary Examiner* — Bumsuk Won
*Assistant Examiner* — Ephrem Mebrahtu
(74) *Attorney, Agent, or Firm* — Shapiro, Gabor and Rosenberger, PLLC (57) ABSTRACT

A diffraction optical system comprises a free curve surface prism (14), and a multilayer diffractive optical element in which a plurality of diffractive element members (121, 122) are laminated together and a diffractive optical surface (DM) having a grating structure is formed at the interface thereof. The diffraction optical system further satisfies the following conditional expression: $0.005 < (\Delta Ng + \Delta Ns)/2 < 0.45$, where $\Delta Ng$ denotes a refractive index difference at g-line on the diffractive optical surface (DM), and $\Delta Ns$ denotes a refractive index difference at s-line on the diffractive optical surface (DM).

15 Claims, 6 Drawing Sheets

(51) Int. Cl.
*G02B 27/00* (2006.01)
*G02B 27/42* (2006.01)

(56) References Cited

U.S. PATENT DOCUMENTS

2010/0045929 A1* 2/2010 Suzuki .................. 351/159

2011/0090389 A1* 4/2011 Saito .................. G02B 27/0172
                                                   348/333.01

OTHER PUBLICATIONS

International Search Report from International Patent Application No. PCT/JP2012/000256, Mar. 19, 2012.
Office Action issued Jul. 24, 2015, in Taiwanese Patent Application No. 101103193.

* cited by examiner

DIFFRACTION OPTICAL SYSTEM USING FREE CURVE SURFACE PRISM, AND IMAGE CAPTURING DEVICE

TECHNICAL FIELD

The present invention relates to a diffraction optical system using a free curve surface prism and an image capturing device that can be used for a monitoring camera.

TECHNICAL BACKGROUND

In recent years, an aspherical surface which is not symmetric with respect to the optical axis, in other words, a "free curve surface" has started to be used. Unlike an optical system that is rotationally symmetric, a free curve surface has flexibility in layout and flexibility in correcting aberrations, which makes it possible to implement a compact and high performance optical system. A prism having a free curve surface (free curve surface prism) in particular can now implement a highly precise shape due to the advancement of materials and molding technology using injected molded glass and resin, and has extremely high potential to produce a compact, high-spec and high performance optical system. However chromatic aberration is often generated in the optical system because of wavelength dispersibility of the prism material, and this causes diminished image quality. This tendency is especially conspicuous if the free curve surface prism is used in a wide wavelength range up to infrared.

Conventionally an optical system, where chromatic aberration that remains in a decentered prism having a free curve surface, is corrected by arranging a diffractive optical element (DOE) between the decentered prism having the free curve surface and an entrance pupil, is known (e.g. see Patent Document 1).

PRIOR ARTS LIST

Patent Document

Patent Document 1: Japanese Patent No. 3559624(B2)

SUMMARY OF THE INVENTION

Problems to be Solved by the Invention

However in the case of the optical system disclosed in Patent Document 1, which uses a single layer DOE, a good diffraction efficiency cannot be obtained over a wide wavelength region, and harmful flares tend to be generated, therefore it is not suitable for use in a wide wavelength range from a visible region to an infrared region.

With the foregoing in view, it is an object of the present invention to provide a diffraction optical system having a free curve surface prism and a diffractive optical element, where the diffraction optical system allows to appropriately correct chromatic aberration generated by a ray propagating on the optical path of the free curve surface prism over a wide wavelength range from a visible region to an infrared region, and can be easily manufactured being less affected by manufacturing errors of the diffractive optical element, and an image capturing device employing the diffraction optical system.

Means to Solve the Problems

An aspect of the diffraction optical system using a free curve surface prism illustrating the present invention comprises:

a prism having a free curve surface which is a rotationally asymmetric aspherical surface; and a multilayer diffractive optical element in which a plurality of diffractive element members are laminated together, and a diffractive optical surface having a grating structure is formed at an interface of the plurality of diffractive element members, and
the following conditional expression (1) is satisfied:

$$0.005 < (\Delta Ng + \Delta Ns)/2 < 0.45 \quad (1)$$

where $\Delta Ng$ denotes a refractive index difference at g-line on the diffractive optical surface, and $\Delta Ns$ denotes a refractive index difference at s-line on the diffractive optical surface.

An aspect of an image capturing device illustrating the present invention comprises the diffraction optical system and an imaging device that captures an image formed by the diffraction optical system.

The multilayer diffractive optical element described above is also referred to as a "contact multilayer diffractive optical element", which is formed by superimposing two or more diffractive element members, where each diffractive element member contacts with each other without a space therebetween.

Advantageous Effects of the Invention

According to the present invention, chromatic aberration generated in a prism having a free curve surface can be appropriately corrected over a wide wavelength range from a visible region to an infrared region, and the diffraction optical device can be easily manufactured being less affected by manufacturing errors of the diffractive optical element.

BRIEF DESCRIPTION OF THE DRAWINGS

FIG. 6 is a set of schematic diagrams depicting an example of a cross-section of a multilayer diffractive optical element, where

DESCRIPTION OF THE EMBODIMENTS

Figure 1:
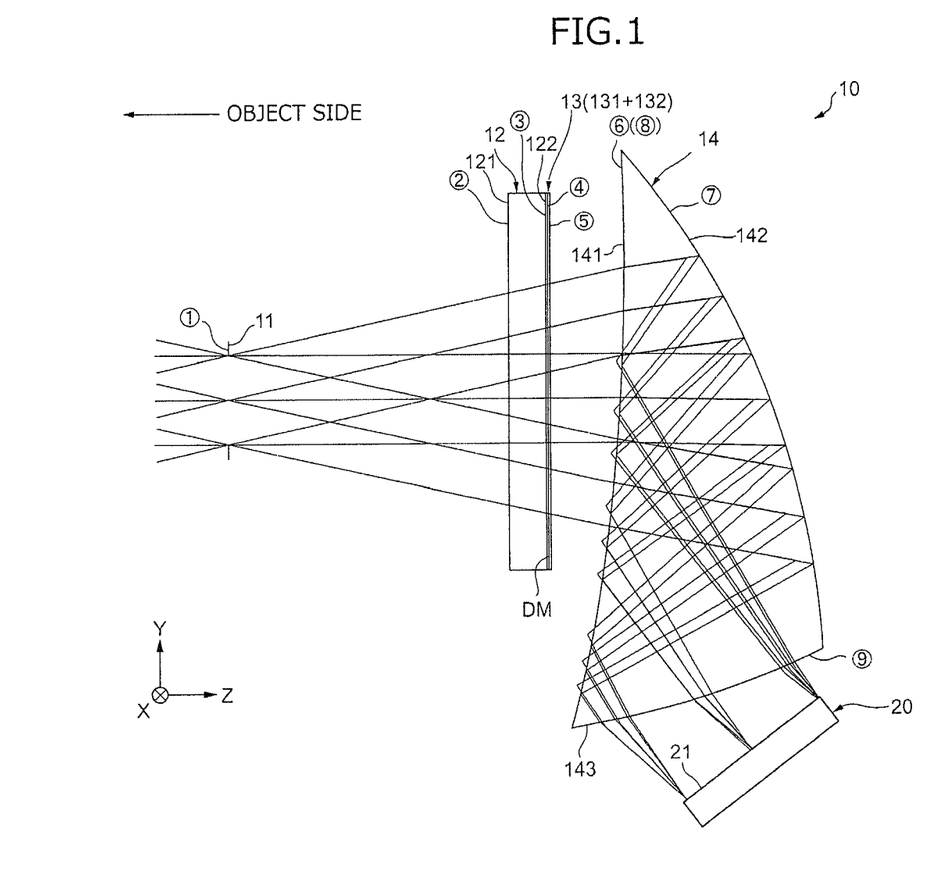
FIG. 1 is a cross-sectional view depicting a diffraction optical system using a free curve surface prism according to Example 1.
Figure 2:
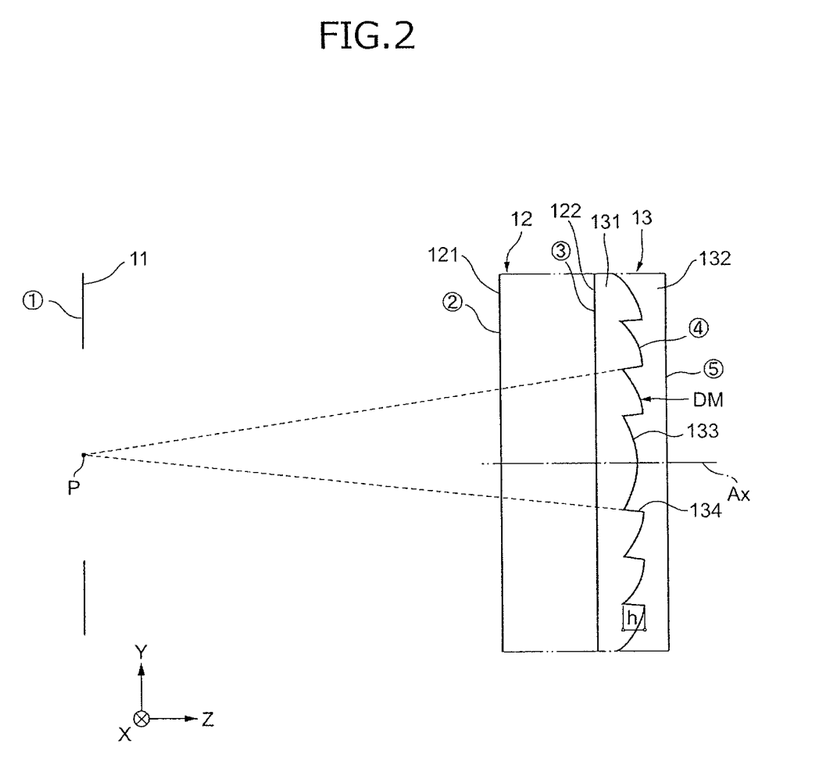
FIG. 2 is a cross-sectional view illustrating a conceptual configuration of a multilayer diffractive optical element according to Example 1.
Figure 4:
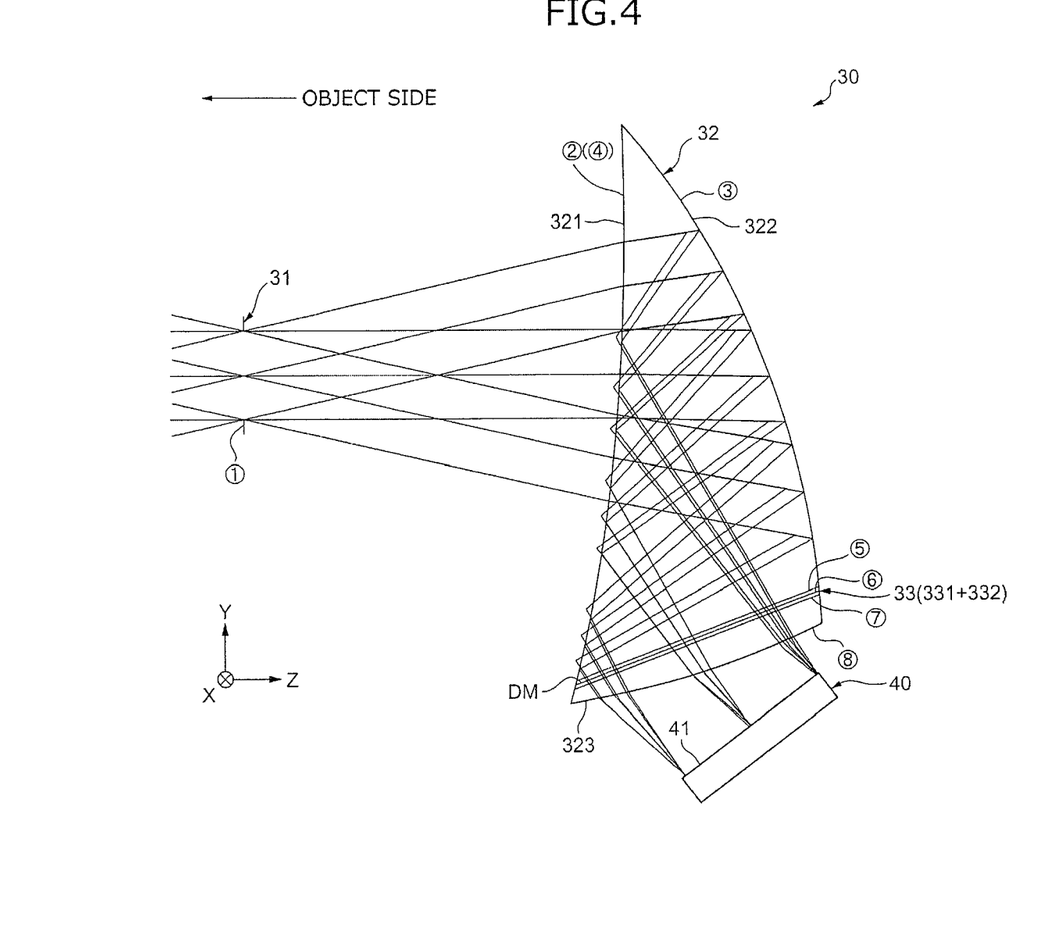
FIG. 4 is a cross-sectional view depicting a diffraction optical system using a free curve surface prism according to Example 2.

Embodiments of the present invention will now be described with reference to the drawings. FIG. 1, FIG. 2 and FIG. 4 illustrate a coordinate system for indicating direction. A numeral enclosed with a circle in FIG. 1, FIG. 2 and FIG. 4 indicates the surface number.

Embodiment 1

As FIG. 1 shows, a diffraction optical system 10 using a free curve surface prism according to Embodiment 1 (may simply be referred to as "diffraction optical system 10" in some cases hereinbelow) is a decentered optical system comprising, in order from an object: a diaphragm 11; a plane glass 12 in which a first surface 121 and a second surface 122 are formed parallel with each other; a multilayer diffractive optical element 13 formed on the second surface 122 of the plane glass 12; and a free curve surface prism 14 having a first surface 141, a second surface 142 and a third surface 143. In FIG. 1, an imaging device 20 (constituted by a CCD or CMOS, for example) and an imaging surface 21 are illustrated, but these are not included in the diffraction optical system 10. Further, an image formed by the diffraction optical system 10 is located on a light receiving surface of the imaging device 20.

Each one of the first surface 141, the second surface 142 and the third surface 143 is formed of a free curve surface, which is a rotationally asymmetric aspheric surface, in the free curve surface prism 14. In general, such a free curve surface prism has large flexibility in designing which makes it possible to implement high optical performance with respect to monochromatic aberrations while achieving miniaturization, but chromatic aberration is likely to occur when the light beam propagates along the optical path in the free curve surface prism, because of the wavelength dispersibility of the prism material.

The multilayer diffractive optical element 13 is disposed to reduce the influence of wavelength dispersibility of the free curve surface prism 14, and to appropriately correct chromatic aberration of the diffraction optical system 10 as a whole, and as shown in FIG. 2, a first diffractive element member 131 and a second diffractive element member 132 are laminated in close contact with each other in this order from the object on the second surface 122 of the plane glass 12, and a diffractive optical surface DM having a grating structure is formed at the interface of the two diffractive element members 131 and 132.

In general, a diffractive optical surface refers to an optical surface for diffracting light, and a diffractive optical element refers to an optical element having this diffractive optical surface, such as a diffraction grating and a Fresnel zone plate which are conventionally known. The light diffracted by such a diffractive optical element presents a behavior that is different from refraction or reflection, and for example the diffracted light has a negative dispersion value, while in the case of refracted light or reflected light has a positive dispersion value. This property is extremely effective for correcting chromatic aberration, and excellent chromatic aberration correction, that can be performed only when an expensive special low dispersion glass is used (cannot be performed by ordinary glass). In the present invention, this property is applied to achromatism at a wavelength band extended to the infrared region.

However in the single-layer diffractive optical element having such a diffractive optical surface, flares are generated by light in a wavelength range which is shifted from the design wavelength, whereby image quality and image forming performance are diminished, and the mode of usage is limited to use in a single wavelength or narrow wavelength range, such as a laser light source. Therefore a multilayer diffractive optical element is suggested lately. This type of diffractive optical element has a serrated diffractive optical surface (relief pattern), and is generated by laminating a plurality of optical element members having a mutually different refractive index and dispersion, which are separated from or contact to one another, and high diffraction efficiency can be maintained in almost all regions of the desired wide wavelength range (e.g. visible light region). In other words, the present invention has good wavelength characteristics of the diffractive efficiency.

Figure 6A:
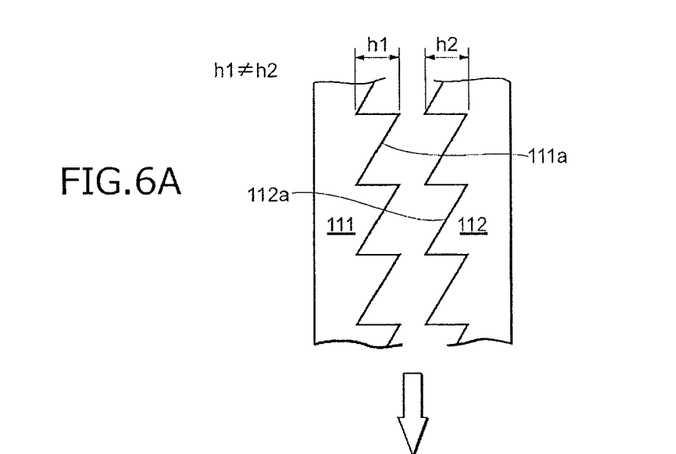
FIG. 6A is a schematic diagram depicting an example of a cross-section of a separation multilayer diffractive optical element according to a prior art.
Figure 6B:
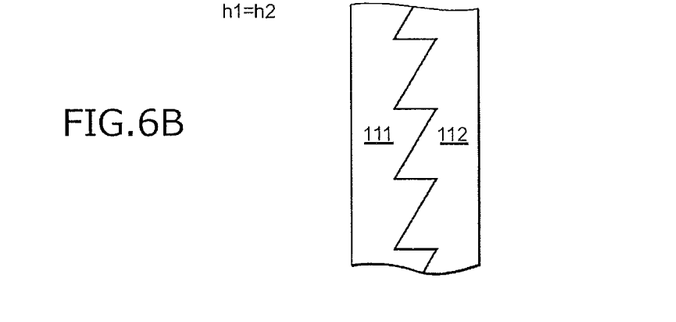
FIG. 6B is a schematic diagram depicting an example of a cross-section of a separation multilayer diffractive optical element according to the present embodiment.

Concerning the structure of the multilayer diffractive optical element, the multilayer diffractive optical element is formed of a first optical element member 111 formed of a first material, and a second optical element member 112 formed of a second material of which the refractive index and the dispersion value are different from those of the first optical element member 111, as shown in FIG. 6A and FIG. 6B, and serrated diffraction gratings 111a and 112a are formed respectively on the surfaces of the optical element members that face each other. In order to satisfy achromatic conditions for specific two wavelengths, the height h1 of the grating (height of the groove) of the first optical element member 111 is set to a predetermined value, and the height h2 of the grating of the second optical element member 112 is set to another predetermined value. Thereby the diffraction efficiency becomes 1.0 with respect to the specific two wavelengths, and fairly high diffraction efficiency can be obtained for the other wavelength. By designing the diffractive optical element to a multilayer type like this, the diffractive optical element can be applied to almost all wavelengths. The diffraction efficiency (diffraction efficiency of the first order diffracted light; the first order diffracted light is used in this embodiment) is defined as the ratio $\eta$ ($=I_1/I_0$), that is the ratio of the intensity $I_0$ of light that enters the diffractive optical element and the intensity $I_1$ of the first order diffracted light included in the light transmitted through the diffractive optical element in the transmission type diffractive optical element.

Further, by satisfying the predetermined conditions, as shown in FIG. 6B, a contact multilayer diffractive optical element, such as the multilayer diffractive optical element 13 according to this embodiment, where the grating height h1 of the first optical element member 111 and the grating height h2 of the second optical element member 112 are matched, can be implemented. In the case of the contact multilayer diffractive optical element, manufacturing is easier compared with the separated multilayer type according to the prior art shown in FIG. 6A, including less strict error sensitivity (tolerance) of the grating height, and less strict error sensitivity (tolerance) of surface roughness of the grating surface, therefore productivity and mass producibility improve, and the cost of optical products can be decreased.

Therefore in the diffraction optical system 10 according to this embodiment, miniaturization and image forming performance, in particular correction of chromatic aberration in a wide range from a short wavelength visible region to an infrared region, are improved using such properties of the contact multilayer diffractive optical element.

In the diffraction optical system 10 according to this embodiment, the following conditional expression (1) is satisfied, where $\Delta Ng$ denotes a refractive index difference on the diffractive optical surface DM (see FIG. 2) of the multilayer diffractive optical element 13 at g-line, and $\Delta Ns$ denotes a refractive index difference on the diffractive optical surface DM of the multilayer diffractive optical element 13 at s-line.

$$0.005<(\Delta Ng+\Delta Ns)/2<0.45 \tag{1}$$

In the multilayer diffractive optical element 13, it is necessary that the refractive index is different on both sides of the diffractive optical surface DM in the optical axis direction, but an error sensitivity in manufacturing increases if the difference between the refractive index difference $\Delta Ng$ at g-line and the refractive index difference ΔNs at s-line on the diffractive optical surface DM is large.

The conditional expression (1) specifies an appropriate range of the average value of the refractive index differences ΔNg and ΔNs on the diffractive optical surface DM of the multilayer diffractive optical element 13, and if this value exceeds the upper limit of the conditional expression (1), the average value of the refractive index differences ΔNg and ΔNs becomes too large, and the manufacturing error sensitivity of the diffractive optical element becomes too large. Conversely, if the lower limit of the conditional expression (1) is not reached, the average value of the refractive index differences ΔNg and ΔNs becomes too small, and the height h of the grating of the diffractive optical surface DM (see FIG. 2) must be increased in order to generate required diffraction. Therefore not reaching the lower limit of the conditional expression (1) is disadvantageous in manufacturing the multilayer diffractive optical element 13. If the height h of the grating is increased, the ratio of the incident light that diagonally enters the end face 134 of the grating (see FIG. 2) increases and diffraction efficiency decreases, and the stray light due to scattering or reflection caused by the incident light which enters the end face 134 increases, resulting in the generation of unwanted flares. In order to fully demonstrate the effect of the conditional expression (1), it is more preferable to set the upper limit to 0.20 and set the lower limit to 0.10.

In the diffraction optical system 10 according to this embodiment, it is preferable to satisfy the following conditional expression (2), where ϕm denotes the refractive power of the diffractive optical surface DM, and ϕ denotes the refractive power of the entire diffraction optical system 10.

$$1.0 \times 10^{-7} < \phi m/\phi \qquad (2)$$

The conditional expression (2) specifies an appropriate range of the ratio ($\phi m/\phi$) of the refractive power $\phi m$ of the diffractive optical surface DM with respect to the refractive power $\phi$ of the entire diffraction optical system 10, and if the lower limit of the conditional expression (2) is not reached, $\phi m$ becomes relatively too strong, and an excessive generation of chromatic aberration tends to occur. In order to fully demonstrate the effect, it is preferable that the lower limit is $1.0 \times 10^{-5}$.

In the diffraction optical system 10 according to this embodiment, it is preferable to satisfy the following conditional expression (3), where h denotes a grating height of the diffractive optical surface DM, and λd denotes the wavelength of d-line.

$$h/\lambda d < 100.0 \qquad (3)$$

The conditional expression (3) specifies an appropriate range of the ratio of the grating height h with respect to the wavelength λd of the d-line as the reference wavelength, and if the upper limit of the conditional expression (3) is exceeded, the grating height h of the diffractive optical surface DM becomes too high, the diffraction efficiency for the oblique incident light is lowered, and undesired flare light is generated, which is inconvenient. The grating height h is the height along the direction of the angle of the principal ray that passes through the vicinity of the end face 134 (see FIG. 2), and is not limited to the height in the optical axis Ax direction. The height h is normally a blaze height based on scalar theory, where the height h in the optical axis Ax direction is determined by multiplying the refractive index difference by the design center wavelength. However the diffraction efficiency is reduced because the incident light is in a direction different from the optical axis Ax direction, and the height h is not perfectly the blaze height. Therefore the grating height h is set to the height along the direction of the angle of the principal ray passing through the vicinity of the end face 134.

In order to reduce scattering by the end face 134 of the diffracted optical surface DM and a drop in diffraction efficiency of the blaze, it is preferable to incline the end face 134, which is normally formed parallel with the optical axis Ax, toward the entrance pupil (center P of the diaphragm 11). In other words, it is preferable to incline the end face 134 following the principal ray. This means that the end face 134 is turned toward the entrance pupil. If the end face 134 is inclined, as shown in FIG. 2, an angle formed by the diffractive surface 133 of the diffractive optical surface DM and the end face 134 becomes obtuse, so the diffractive optical surface DM can be formed by resin molding using a die, which means that the manufacturing cost can be decreased. Furthermore, it is even more preferable if the end face 134 portion has such a structure as steps or a rough surface to prevent specular reflection, because stray light is reduced. To further demonstrate the effect of the present invention, it is preferable that the upper limit of the conditional expression (3) is 50.0.

In the diffraction optical system 10 according to this embodiment, it is preferable to satisfy the following conditional expression (4), where the wavelength λS at the short wavelength end of the wavelength range to be used is 450 nm or less, and the wavelength λL at the long wavelength end of the wavelength range to be used is 800 nm or more, and νIR denotes an Abbe number of the infrared.

$$50.0 < |\nu IR| \qquad (4)$$

The conditional expression (4) indicates an appropriate range of the Abbe number of the infrared νIR. νIR is defined as follows. νIR indicates the achromatic state of the diffraction optical system 10 as a whole, in other words, νIR indicates the achromatic capability of the diffraction optical system 10.

νIR=focal length fd of the entire diffraction optical system at d-line/(focal length fS of the entire diffraction optical system at wavelength λS−focal length fL of the entire diffraction optical system at wavelength λL)

In order to achieve good chromatic aberration correction in the range from visible region to infrared region, satisfying the conditional expression (4) is essential. If the lower limit of the conditional expression (4) is not reached, the achromatic state of the regions becomes insufficient, and practicality is diminished. This means that the multilayer diffractive optical element 13 is not completely functioning, and good achromatic operation in a wide wavelength range, from visible region to infrared region, cannot be implemented. To demonstrate the achromatic effect more fully, it is preferable that the lower limit of the conditional expression (4) is 70.0. For the wavelength λS, g-line is preferable, and for the wavelength λL, s-line or t-line is preferable.

In the diffraction optical system 10 according to this embodiment, it is preferable to satisfy the following conditional expression (5), where Ed, Eg and EC are the diffraction efficiency design values with respect to d-line, g-line and C-line respectively.

$$0.8 < (Eg+EC)/(2 \times Eg) \qquad (5)$$

The conditional expression (5) specifies an appropriate range of the balance of the diffraction efficiency when a broader band is used. If the lower limit of the conditional expression (5) is not reached, the diffraction efficiency is lowered in either the short wavelength or long wavelength, resulting in an increase in diffraction flares and a diminishing of image quality. In order to demonstrate the effect more fully, it is preferable that the lower limit of the conditional expression (5) is 0.95. The diffraction efficiency calculation is based on the scalar calculation.

In the diffraction optical system 10 according to this embodiment, it is preferable that the following conditional expression (6) is satisfied, where one of the constituent material of the first diffractive element member 131 and the constituent material of the second diffractive element member 132 is a material of high refractive index–low dispersion, and the other is a material of low refractive index–high dispersion, and $\Delta(NF-NC)$ denotes the difference of the main dispersion $(NF-NC)$ between the material of high refractive index–low dispersion and the material of low refractive index–high dispersion.

$$-20.0 < \Delta Nd/\Delta(NF-NC) < -2.0 \qquad (6)$$

The conditional expression (6) shows the appropriate distribution of the refractive index and dispersion between the material of high refractive index–low dispersion and the material of low refractive index–high dispersion. This condition is an essential requirement to obtain a sufficiently high diffraction efficiency over the entire range of a wide wavelength band. If the range of the conditional expression (6) is not satisfied, obtaining a sufficiently high diffraction efficiency is difficult. In order to demonstrate the effect more fully, it is preferable that the lower limit of the conditional expression (6) is $-5.0$. Further it is preferable that the upper limit is $-3.0$.

In the diffraction optical system 10 according to this embodiment, it is preferable to satisfy the following conditional expression (7), where $\Delta gs$ denotes a difference between the focal length at g-line and the focal length at s-line, and $\Delta FC$ denotes a difference between the focal length at F-line and the focal length at C-line.

$$0.5 < \Delta gs/\Delta FC < 8.0 \qquad (7)$$

The conditional expression (7) indicates the achromatic state of the diffraction optical system 10 as a whole, and shows the conditional range for the achromatic state required for the diffraction optical system 10 to be used for such applications as a monitor camera. The focal length in this case refers to the calculation result obtained by tracing a minute luminous flux around the reference axis of the eccentric optical system. This conditional expression is applicable to wavelengths up to the s-line, for which a standard imaging device such as a CCD has sensitivity.

If the upper limit of the conditional expression (7) is exceeded, achromatism becomes insufficient, and a good image cannot be captured. If the lower limit of the conditional expression (7) is not reached, on the other hand, the achromatic performance is sufficient but the grating pitch of the diffractive optical surface DM tends to be finer, resulting in the frequent generation of flares and difficulty in manufacturing, which is inconvenient. In order to demonstrate the effect more fully, it is preferable that the upper limit of the conditional expression (7) is 4.0. Further it is preferable that the lower limit thereof is 1.0.

In the diffraction optical system 10 according to this embodiment, it is preferable to satisfy the following conditional expressions (8) and (9), in order to achieve excellent performance in the infrared region over an even wider wavelength range.

$$0.5 < \Delta gt/\Delta FC < 8.0 \qquad (8)$$

$$0.3 < Xan/Yan < 2.5 \qquad (9)$$

In the conditional expression (8), $\Delta gt$ denotes a difference between the focal length at g-line and the focal length at t-line at the maximum image height, and $\Delta FC$ denotes a difference between the focal length at F-line and the focal length at C-line at maximum image height. Just like the conditional expression (7), the conditional expression (8) indicates the achromatic state of the diffraction optical system 10 as a whole, and shows the conditional range for the achromatic state required for such applications as a monitor camera. This conditional expression is applicable to a special imaging element which has sensitivity for a wavelength even longer than the sensitivity of a standard CCD or the like, and can handle a wavelength up to t-line.

If the upper limit of the conditional expression (8) is exceeded, achromatism becomes insufficient and a good image cannot be captured. If the lower limit of the conditional expression (8) is not reached, on the other hand, the grating pitch of the diffractive optical surface DM tends to be finer, which is inconvenient, just like the case of conditional expression (7). In order to demonstrate the effect more fully, it is preferable that the upper limit of the conditional expression (8) is 4.0. Further it is preferable that the lower limit thereof is 1.0.

In the conditional expression (8), Xan denotes an incident half-angle in the X direction of the diffraction optical system 10, and Yan denotes an incident half-angle in the Y direction thereof. As mentioned above, the free curve surface prism has advantages in that compactness can be implemented by folding the optical path, and advanced aberration correction can be implemented by arbitrarily selecting a surface shape, but a problem here is that chromatic aberration increases if the optical path in the prism becomes longer in order to widen the angle or to implement brightening. Therefore a disadvantage is that if the difference between the vertical incident angle and the horizontal incident angle is too large, the optical path length for the ray having the longer incident angle to pass through the prism becomes too long, and more aberrations tend to generate.

The conditional expression (9) specifies an optimum range of the ratio of the incident half-angles Xan and Yan. If the range of the conditional expression (9) is exceeded, the grating pitch tends to be finer to achieve sufficient correction of chromatic aberration with respect to the ray having the larger incident half-angle, which results in that flares are more likely to generate, making manufacturing difficult. In addition, the aspect ratio of the screen becomes unusual, vertically too long or horizontally too long, which is impractical. In order to demonstrate the effect more fully, it is preferable that the upper limit of the conditional expression (9) is 2.0. Further it is preferable that the lower limit thereof is 0.5.

It is preferable to satisfy the following conditions to actually configure the diffraction optical system 10 according to this embodiment. For example, to configure the free curve surface prism 14, it is preferable that the diffraction optical system 10 is manufactured by injection molding using resin or molded glass. In order to minimize birefringence caused by the internal strain of a high definition image optical system or the like, injection molding using molded glass is desirable. If the molding of glass or resin is performed using a die, the processing manufacturing becomes easy and cost can be decreased.

Further it is preferable that multilayer diffractive optical element 13 is constituted by UV-curable resin, since production efficiency increases. In this case, man-hours can be reduced and cost can be decreased, which is advantageous. In order to reduce size and weight, the optical material constituting the multilayer diffractive optical element 13 is preferably a resin material of which specific gravity is 2.0 or less. This is effective to reduce the weight of the optical system, since the specific gravity of resin is lower than that of glass. To demonstrate the effect more fully, it is preferable that the specific gravity of resin material is 1.6 or less.

In the multilayer diffractive optical element 13, whether the refractive power thereof is positive or negative, it is Important to make the convex side end portion of the diffractive element member constituted by a high refractive index material sharp, in order to suppress a drop in diffraction efficiency during manufacturing. In other words, in the case of negative power, it is necessary that the diffractive element member closer to the entrance pupil is formed of a low refractive index material. In FIG. 2, the cross-sectional view of the end face 134 is a straight line, but this may be stepped or curved as well. For example, by making the end face stepped, flare light, which light of each wavelength generated on the end face, can be uniform.

In order to maintain good moldability and to ensure excellent mass producibility, a viscosity (viscosity of uncured product) of the material constituting the second diffractive element member 132 of the multilayer diffractive optical element 13 is preferably at least 40 (mPa·s). If it is 40 or more (mPa·s) or less, resin tends to flow easily during molding, which makes it difficult to mold a precise shape. On the other hand, the viscosity of the material constituting the first diffractive element member 131 is preferably at least 2000 or more (mPa·s).

Now an image capturing device according to this embodiment will be described. As FIG. 1 shows, the image capturing device includes the diffraction optical system 10 and the imaging device 20 described above, and is configured so that an object image formed on an imaging surface 21 by the diffraction optical system 10 is captured by the imaging device 20.

Embodiment 2

As FIG. 4 shows, a diffraction optical system 30 using a free curve surface prism according to Embodiment 2 (may simply be referred to as "diffraction optical system 30" in some cases hereinbelow) is a decentered optical system, comprising, in order from an object: a diaphragm 31, a free curve surface prism 32 having a first surface 321, a second surface 322 and a third surface 323; and a multilayer diffractive optical element 33 installed inside the free curve surface prism 32. In FIG. 4, an imaging device 40 (constituted by a CCD, CMOS, or the like, for example) and an imaging surface 41 are illustrated, but these are not included in the diffraction optical system 30. Further an image formed by the diffraction optical system 30 is located on a light receiving surface of the imaging device 40.

In the free curve surface prism 32, each one of the first surface 321, the second surface 322 and the third surface 323 is formed of a free curve surface, which is a rotationally asymmetric aspheric surface. The multilayer diffractive optical element 33 is disposed to reduce the influence of wavelength dispersibility of the free curve surface prism 32 and to appropriately correct chromatic aberration of the diffraction optical system 30 as a whole, and a first diffractive element member 331 and a second diffractive element member 332 are laminated in close contact to each other, and a diffractive optical surface DM having a grating structure is formed at the interface of the two diffractive element members 331 and 332. The configuration of the multilayer diffractive optical element 33 is the same as the multilayer diffractive optical element 13 shown in FIG. 2, and therefore detailed description thereof is omitted.

In this embodiment as well, it is preferable to apply the preferred modes described in Embodiment 1, such as satisfying the conditional expressions (2) to (9) in the same manner.

Now an image capturing device according to this embodiment will be described. As FIG. 4 shows, the image capturing device includes the diffraction optical system 30 and the imaging device 40 described above, and is configured so that an object image formed on an imaging surface 41 by the diffraction optical system 30 is captured by the imaging device 40.

The diffraction optical system and the image capturing device using the free curve surface prism according to the present invention are not limited to the embodiments described above, but numerous modifications and variations can be made. For example, the position of disposing the diffractive optical element can be arbitrarily set and the diffractive optical element may be disposed in a plurality of locations. The number of layers of the diffractive optical element is not limited to two, but may be three or more. Furthermore, the diffraction optical system using a free curve surface prism according to the present invention may be configured to incorporate other optical members, such as an aspherical lens, a refractive index distributed lens and a crystalline material lens.

EXAMPLES

Specific examples (Example 1 and Example 2) of the diffraction optical system using a free curve surface prism according to the present invention will now be described. In each example, the phase difference of the diffractive optical surface is calculated by using the phase function method.

The phase polynomial for determining the shape of the diffractive optical surface is shown in the following equation (A).

[Equation 1]

$$Z = \sum_{j=1} C_j x^m y^n \tag{A}$$

In this equation (A), j, m and n satisfy the relationship expressed by the following equation (B).

[Equation 2]

$$j = \frac{(m+n)^2 + m + 3n}{2} \tag{B}$$

The free curve surface is defined by the following equation (C). In equation (C), Z denotes a sag quantity of the surface parallel with the center axis, c denotes a curvature of the surface vertex (origin), k denotes a conic constant, h denotes a distance from the origin on a plane that intersects vertically to the center axis at the origin, and Cj denotes a coefficient of the xy polynomial.

[Equation 3]

$$Z = \frac{ch^2}{1+\sqrt{1-(1+k)c^2h^2}} + \sum_{j=2} C_j x^m y^n \quad (C)$$

Here the relationship expressed by the following equations (D) and (E) are established among j, m and n of the equation (C).

[Equation 4]

$$j = \frac{(m+n)^2 + m + 3n}{2} + 1 \quad (D)$$

[Equation 5]

$$m + n \leq 10 \quad (E)$$

In each example, as a calculation target of the aberration characteristics, each spectral line of g-line, F-line, e-line, d-line, C-line, s-line and t-line is used. The wavelengths of these spectral lines (unit: nm) are as follows.

| | |
|---|---|
| g-line | 435.835 |
| F-line | 486.133 |
| e-line | 546.074 |
| d-line | 587.562 |
| C-line | 656.273 |
| s-line | 852.110 |
| t-line | 1013.980 |

Example 1

Example 1 will be described with reference to FIG. 1 to FIG. 3 and Table 1 to Table 8. As FIG. 1 shows, a diffraction optical system 10 using a free curve surface prism according to Example 1 (may simply be referred to as "diffraction optical system 10" in some cases hereinbelow) is a decentered optical system comprising, in order from an object: a diaphragm 11; a plane glass 12 in which a first surface 121 and a second surface 122 are formed parallel with each other; a multilayer diffractive optical element 13 formed on the second surface 122 of the plane glass 12; and a free curve surface prism 14 having a first surface 141, a second surface 142 and a third surface 143.

In the free curve surface prism 14, each one of the first surface 141, the second surface 142 and the third surface 143 is formed of a free curve surface, which is a rotationally asymmetric aspheric surface. As FIG. 2 shows, in the multilayer diffractive optical element 13, a first diffractive element member 131 and a second diffractive element member 132 are laminated in close contact to each other in this order from the object, on the second surface 122 of the plane glass 12, and a diffractive optical surface DM having a grating structure is formed at the interface of the two diffractive element members 131 and 132. In this example, a first diffractive element member 131 is formed of a material of high refractive index–low dispersion, and the second diffractive element member 132 is formed of a material of low refractive index–high dispersion, and the multilayer diffractive optical element 13 has positive refractive power.

Table 1 below shows configuration data of the diffraction optical system 10 according to Example 1. "*a" in the table showing the configuration data of each example shown below denotes that the surface has a shape represented by a phase difference function, "*b" denotes that the surface is a free curve surface, and "*c" denotes that the surface is decentered. The units used for the radius of curvature, surface distance and other lengths in all the specifications below are "mm" unless otherwise specified. However the units are not limited to "mm", but other appropriate units can be used since an equivalent optical performance can be obtained even if the optical system is proportionally expanded or reduced. This also applies to Example 2, which will be described later.

TABLE 1

(Configuration data)

| Surface number | Radius of curvature | Surface distance |
|---|---|---|
| Object | Infinite | Infinite |
| 1(diaphragm) | Infinite | 5.0000 |
| 2 | Infinite | 0.6667 |
| 3 | Infinite | 0.0333 |
| 4*a*c | Infinite | 0.0333 |
| 5 | Infinite | 1.2271 |
| 6*b*c | −30.3581 | |
| 7*b*c | −14.0818 | |
| 8*b*c | −30.3581 | |
| 9*b*c | −4.8808 | −0.8494 |
| Image plane | Infinite | |

In the diffraction optical system 10 according to Example 1, the plane glass 12 and the free curve surface prism 14 are constituted by the same glass material. Table 2 below shows the refractive index of the material of the plane glass 12 and the free curve surface prism 14 at each spectral line of g-line, F-line, e-line, d-line, C-line, s-line and t-line.

TABLE 2

(Refractive index data)

| Wavelength (nm) | Refractive index (plate glass and free curve surface prism) |
|---|---|
| g-line (435.835) | 1.52669 |
| F-line (486.133) | 1.52238 |
| e-line (546.074) | 1.51872 |
| d-line (587.562) | 1.51680 |
| C-line (656.273) | 1.51432 |
| s-line (852.110) | 1.50980 |
| t-line (1013.980) | 1.50731 |

Table 3 below shows the refractive index of each material of the first diffractive element member 131 and the second diffractive element member 132 at each spectral line of g-line, F-line, e-line, d-line, C-line, s-line and t-line.

TABLE 3

(Refractive index data)

| | Refractive index | |
|---|---|---|
| Wavelength (nm) | (First diffractive element member) | (Second diffractive element member) |
| g-line (435.835) | 1.57133 | 1.54906 |
| F-line (486.133) | 1.56499 | 1.53911 |
| e-line (546.074) | 1.55981 | 1.53153 |
| d-line (587.562) | 1.55714 | 1.5278 |

TABLE 3-continued (Refractive index data)

| Wavelength (nm) | Refractive index | |
|---|---|---|
| | (First diffractive element member) | (Second diffractive element member) |
| C-line (656.273) | 1.55348 | 1.52329 |
| s-line (852.110) | 1.54846 | 1.5162 |
| t-line (1013.980) | 1.54582 | 1.51201 |

Table 4 below shows the value of coefficient C of the phase difference function (equation (B)) on the fourth surface (diffractive optical surface DM).

TABLE 4

(Phase difference function coefficient data)

| Coefficient | |
|---|---|
| C3 | −9.6000E−04 |
| C5 | −8.4000E−04 |
| C10 | 2.7810E−05 |
| C14 | 2.1600E−05 |

Table 5 below shows each term coefficient of the free curve surface data equation (equation (A)) of the sixth surface (eighth surface), seventh surface and ninth surface.

TABLE 5

(Free curve surface data)

| Term | Sixth (eighth) surface coefficient | Seventh surface coefficient | Ninth surface coefficient |
|---|---|---|---|
| C4($x^2$) | −8.6820023E−04 | 3.6037855E−04 | 1.2834385E−02 |
| C6($y^2$) | 3.8045241E−04 | 2.5973410E−04 | 7.8708196E−03 |
| C8($x^2*y$) | 8.3096007E−06 | −1.2458402E−05 | 8.7026592E−04 |
| C10($y^3$) | 7.2547211E−06 | −1.0288437E−05 | 9.1559626E−05 |
| C11($x^4$) | −2.0681573E−06 | −1.1192385E−06 | 2.9785335E−05 |
| C13($x^2*y^2$) | −1.0238401E−06 | −1.1701761E−06 | 1.8868075E−04 |
| C15($y^4$) | −3.6093202E−07 | −1.8135487E−07 | 5.2326361E−06 |
| C17($x^4*y$) | 3.0997379E−07 | 5.3874899E−08 | −9.2399463E−06 |
| C19($x^2*y^3$) | 1.1058042E−07 | −1.4068248E−08 | 6.9154034E−06 |
| C21($y^5$) | 1.6643911E−08 | 6.9332255E−09 | −1.9942454E−06 |

Table 6 shows the decentering data of the fourth surface, sixth surface (eighth surface), seventh surface and ninth surface. Here XDE, YDE and ZDE denote a shift in the X direction, Y direction and Z direction respectively, and ADE, BDE and CDE denote the inclination (unit: degrees) from the X axis, Y axis and Z axis respectively. This is the same in Table 14 below.

TABLE 6

(Decentering data)

| Decentering | Fourth surface | Sixth (eighth) surface | Seventh surface | Ninth surface |
|---|---|---|---|---|
| XDE | 0.0 | 0.0 | 0.0 | 0.0 |
| YDE | 0.666666667 | −0.372003973 | 0.118037618 | −5.034353463 |
| ZDE | 0.0 | 0.0 | 2.633333333 | 2.324955306 |
| ADE | 0.0 | −4.040538719 | 20.88166768 | −69.12432971 |
| BDE | 0.0 | 0.0 | 0.0 | 0.0 |
| CDE | 0.0 | 0.0 | 0.0 | 0.0 |

Table 7 below shows the corresponding value of each parameter on the above mentioned conditional expressions (1) to (9).

TABLE 7

(Parameter corresponding values)

| Parameter | Corresponding value |
|---|---|
| ΔNg | 0.02227 |
| ΔNs | 0.03226 |
| Φm | 0.00068862 |
| Φ | 0.05292 |
| h | 20.0 (μm) |
| λd | 0.587562 (μm) |
| fd | 6.29867 |
| fg | 6.25183 |
| fF | 6.27177 |
| fC | 6.30930 |
| fs | 6.32927 |
| ft | 6.33957 |
| ft − fg | 0.08773 |
| Δgs(fs − fg) | 0.07743 |
| ΔFC(fC − fF) | 0.03753 |
| Eg | 0.9984 |
| EC | 0.9844 |
| Ed | 1.0000 |
| Δ(NF − NC) | −0.00467 |
| xan | 16.95122 |
| yan | 12.87656 |

Table 8 below shows the corresponding values of the above mentioned conditional expressions (1) to (9). As Table 8 shows, Example 1 satisfies all the conditional expressions (1) to (9).

TABLE 8

(Conditional expression corresponding values)

| Conditional expression | | Corresponding value |
|---|---|---|
| (1) | (ΔNg + ΔNs)/2 | 0.02727 |
| (2) | Φm/Φ | 0.01301 |
| (3) | h/λd | 34.03896 |
| (4) | |νIR| | |
| | s-line | 81.347 |
| | t-line | 71.796 |
| (5) | (Eg + EC)/(2 × Ed) | 0.9914 |
| (6) | ΔNd/Δ(NF − NC) | −6.283 |
| (7) | Δgs/ΔFC | 2.945 |
| (8) | Δgt/ΔFC | 2.258 |
| (9) | xan/yan | 1.3164 |

Figure 3:
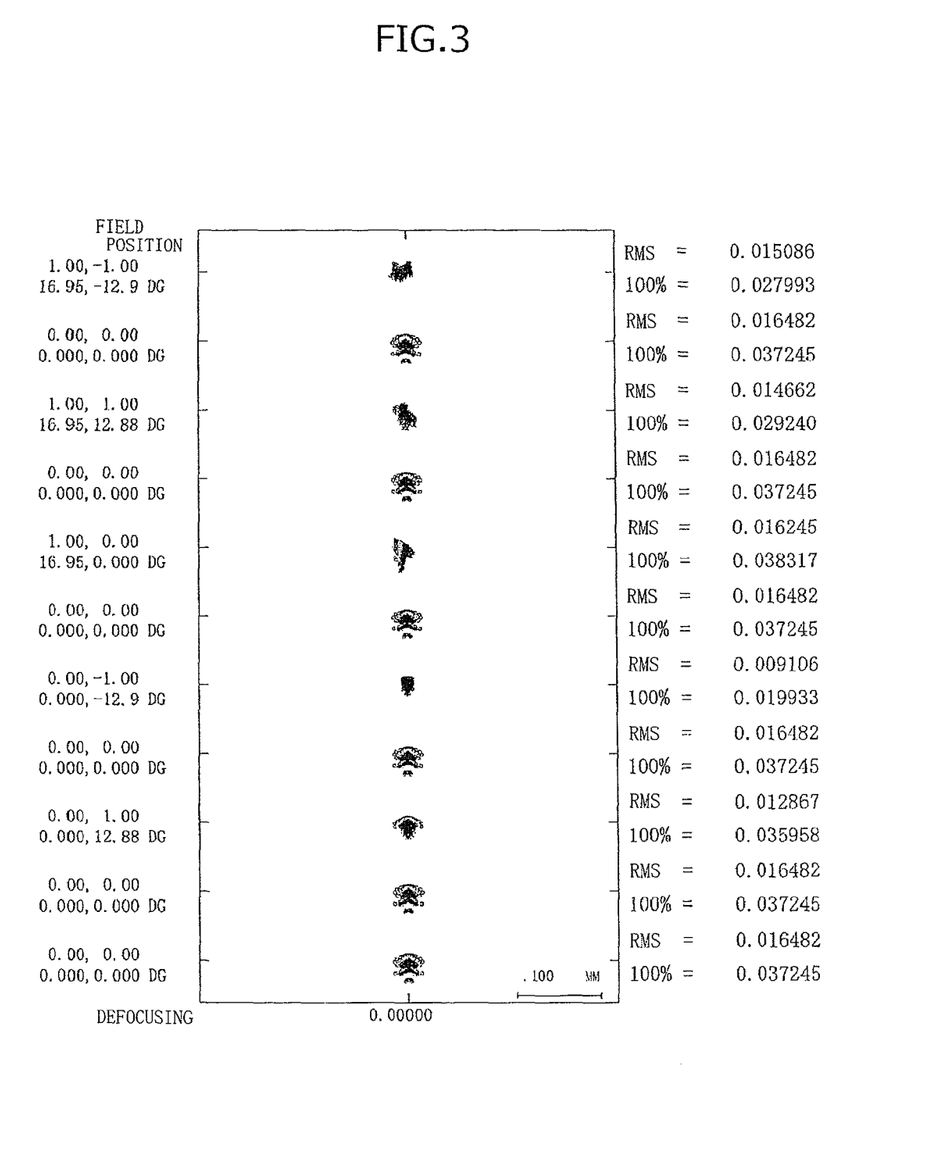
FIG. 3 is a spot diagram of the diffraction optical system using the free curve surface prism according to Example 1.

FIG. 3 is a spot diagram for each spectral line of g-line, F-line, e-line, d-line, C-line, s-line and t-line of the diffraction optical system 10 according to Example 1. The length of the straight line indicated at the bottom of the spot diagram corresponds to 0.1 mm on the imaging surface. As FIG. 3 shows, chromatic aberration is corrected well, and an excellent image forming performance is implemented.

Example 2

Example 2 will be described with reference to FIG. 4 and Table 9 to Table 16. As FIG. 4 shows, a diffraction optical system 30 using a free curve surface prism according to Example 2 (may simply be referred to as "diffraction optical system 30" in some cases hereinbelow) is a decentered optical system comprising, in order from an object: a diaphragm 31; a free curve surface prism 32 having a first surface 321, a second surface 322 and a third surface 323; and a multilayer diffractive optical element 33 installed inside the free curve surface prism 32.

In the free curve surface prism 32, each one of the first surface 321, the second surface 322 and the third surface 323 is formed of a free curve surface, which is a rotationally asymmetric aspheric surface. In the multilayer diffractive optical element 33 installed inside the free curve surface prism 32, a first diffractive element member 331 and a second diffractive element member 332 are laminated in close contact to each other, and a diffractive optical surface DM having a grating structure is formed at the interface of the two diffractive element members 331 and 332. In this example, the first diffractive element member 331 is formed of a material of low refractive index–high dispersion, and the second diffractive element member 332 is formed of a material of high refractive index–low dispersion, and the multilayer diffractive optical element 13 has positive refractive power.

Table 9 below shows configuration data of the diffraction optical system 30 according to Example 2. "*a" in a table showing the configuration data of each example shown below denotes that the surface has a shape represented by a phase differential function, "*b" denotes that the surface is a free curve surface, and "*c" denotes that the surface is decentered.

TABLE 9

(Configuration data)

| Surface number | Radius of curvature | Surface distance |
|---|---|---|
| Object | Infinite | Infinite |
| 1(Diaphragm) | Infinite | 6.6667 |
| 2*b*c | −30.3581 | |
| 3*b*c | −14.0818 | |
| 4*b*c | −30.3581 | |
| 5 | Infinite | |
| 6*a*c | Infinite | |
| 7 | Infinite | |
| 8*b*c | −4.8808 | −0.8352 |
| Image plane | Infinite | |

Table 10 below shows the refractive index of the material of the free curve surface prism 32 at each spectral line of g-line, F-line, e-line, d-line, C-line, s-line and t-line.

TABLE 10

(Refractive index data)

| Wavelength (nm) | Refractive index (free curve surface prism) |
|---|---|
| g-line (435.835) | 1.52669 |
| F-line (486.133) | 1.52238 |
| e-line (546.074) | 1.51872 |
| d-line (587.562) | 1.51680 |
| C-line (656.273) | 1.51432 |
| s-line (852.110) | 1.50980 |
| t-line (1013.980) | 1.50731 |

Table 11 below shows the refractive index of each material of the first diffractive element member 331 and the second diffractive element member 332 at each spectral line of g-line, F-line, e-line, d-line, C-line, s-line and t-line.

TABLE 11

(Refractive index data)

| | Refractive index | |
|---|---|---|
| Wavelength (nm) | (First diffractive element member) | (Second diffractive element member) |
| g-line (435.835) | 1.54906 | 1.57133 |
| F-line (486.133) | 1.53911 | 1.56499 |
| e-line (546.074) | 1.53153 | 1.55981 |
| d-line (587.562) | 1.5278 | 1.55714 |
| C-line (656.273) | 1.52329 | 1.55348 |
| s-line (852.110) | 1.5162 | 1.54846 |
| t-line (1013.980) | 1.51201 | 1.54582 |

Table 12 below shows the value of the coefficient C of the phase difference function (equation (B)) on the sixth surface (diffractive optical surface DM).

TABLE 12

(Phase difference function coefficient data)

| Coefficient | |
|---|---|
| C3 | −3.6000E−03 |
| C5 | −2.7000E−03 |
| C10 | 2.7000E−06 |
| C14 | −5.4000E−06 |

Table 13 below shows each term coefficient of the free curve surface data equation (equation (A)) of the second surface (fourth surface), third surface and eighth surface.

TABLE 13

(Free curve surface data)

| Term | Second (fourth) surface coefficient | Third surface coefficient | Eighth surface coefficient |
|---|---|---|---|
| C4($x^2$) | −8.6820023E−04 | 3.6037855E−04 | 1.2834385E−02 |
| C6($y^2$) | 3.8045241E−04 | 2.5973410E−04 | 7.8708196E−03 |
| C8($x^2*y$) | 8.3096007E−06 | −1.2458402E−05 | 8.7026592E−04 |
| C10($y^3$) | 7.2547211E−06 | −1.0288437E−05 | 9.1559626E−05 |
| C11($x^4$) | −2.0681573E−06 | −1.1192385E−06 | 2.9785335E−05 |
| C13($x^2*y^2$) | −1.0238401E−06 | −1.1701761E−06 | 1.8868075E−04 |
| C15($y^4$) | −3.6093202E−07 | −1.8135487E−07 | 5.2326361E−06 |
| C17($x^4*y$) | 3.0997379E−07 | 5.3874899E−08 | −9.2399463E−06 |
| C19($x^2*y^3$) | 1.1058042E−07 | −1.4068248E−08 | 6.9154034E−06 |
| C21($y^5$) | 1.6643911E−08 | 6.9332255E−09 | −1.9942454E−06 |

Table 14 below shows decentering data of the second surface (fourth surface), third surface, sixth surface and eighth surface.

TABLE 14

(Decentering data)

| Decentering | Second (fourth) surface | Third surface | Sixth surface | Eighth surface |
|---|---|---|---|---|
| XDE | 0.0 | 0.0 | 0.0 | 0.0 |
| YDE | −0.372003973 | 0.118037618 | −5.034353463 | −4.367686796 |
| ZDE | 0.0 | 2.633333333 | 2.324955306 | 52.324955306 |
| ADE | −4.040538719 | 20.88166768 | −69.1243297 | −69.1243297 |
| BDE | 0.0 | 0.0 | 0.0 | 0.0 |
| CDE | 0.0 | 0.0 | 0.0 | 0.0 |

Table 15 below shows the corresponding value of each parameter on the above mentioned conditional expressions (1) to (9).

TABLE 15

(Parameter corresponding value)

| Parameter | Corresponding value |
|---|---|
| ΔNg | 0.02227 |
| ΔNs | 0.03226 |
| Φm | 0.0016584 |
| Φ | 0.05306 |
| h | 20.0 (μm) |
| λd | 0.587562 (μm) |
| fd | 6.28277 |
| fg | 6.23503 |
| fF | 6.24967 |
| fC | 6.26050 |
| fs | 6.26693 |
| ft | 6.25950 |
| ft − fg | 0.02447 |
| Δgs(fs − fg) | 0.03190 |
| ΔFC(fC − fF) | 0.01083 |
| Eg | 0.9984 |
| EC | 0.9844 |
| Ed | 1.0000 |
| Δ(NF − NC) | −0.00467 |
| xan | 16.95122 |
| yan | 12.87656 |

Table 16 below shows the corresponding values of the above mentioned conditional expressions (1) to (9). As Table 16 shows, the second example satisfies all the conditional expressions (1) to (9).

TABLE 16

(Conditional expression corresponding values)

| Conditional expression | | Corresponding value |
|---|---|---|
| (1) | (ΔNg + ΔNs)/2 | 0.02727 |
| (2) | Φm/Φ | 0.03126 |
| (3) | h/λd | 34.03896 |
| (4) | \|vIR\| | |
| | s-line | 196.952 |
| | t-line | 256.754 |
| (5) | (Eg + EC)/(2 × Ed) | 0.9914 |
| (6) | ΔNd/Δ(NF − NC) | −6.283 |
| (7) | Δgs/ΔFC | 2.945 |
| (8) | Δgt/ΔFC | 2.258 |
| (9) | xan/yan | 1.3164 |

Figure 5:
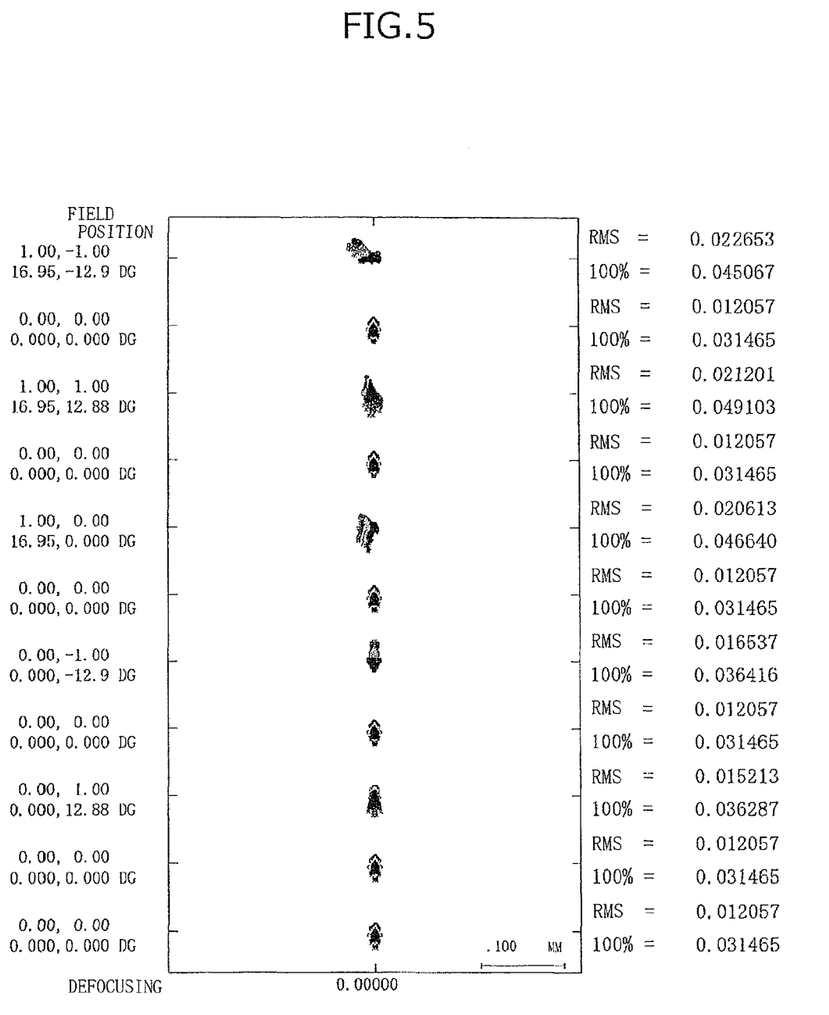
FIG. 5 is a spot diagram of the diffraction optical system using the free curve surface prism according to Example 2.

FIG. 5 is a spot diagram for each spectral line of g-line, F-line, e-line, d-line, C-line, s-line and t-line of the diffraction optical system 10 according to Example 2. The length of the straight line indicated at the bottom of the spot diagram corresponds to 0.1 mm on the imaging surface. As FIG. 5 shows, chromatic aberration is corrected well, and an excellent image forming performance is implemented.

EXPLANATION OF NUMERALS AND CHARACTERS

11, 31 diaphragm
12 plane glass
13, 33 diffractive optical element
14, 32 free curve surface lens
20, 40 imaging device
131, 331 first diffractive element member
132, 332 second diffractive element member
DM diffractive optical surface

The invention claimed is:

1. A diffraction optical system adapted for operation with light having wavelength from λS to λL, in which λS is equal to or lower than 450 nm and λL is equal to or higher than 800 nm, comprising:
   a prism having a free curve surface which is a rotationally asymmetric aspherical surface; and
   a multilayer diffractive optical element in which a plurality of diffractive element members are laminated together, and a diffractive optical surface having a grating structure is formed at an interface of the plurality of diffractive element members, and
   the following conditional expression (1) being satisfied:

$$0.005 < (\Delta Ng + \Delta Ns)/2 < 0.20 \quad (1)$$

where ΔNg denotes a refractive index difference at g-line of 436 nm wavelength on the diffractive optical surface, and
   ΔNs denotes a refractive index difference at s-line of 852 nm wavelength on the diffractive optical surface, and
   the following conditional expression (4) is satisfied:

$$50.0 < |vIR| \quad (4)$$

where vIR denotes an Abbe number of the infrared, vIR being defined as follows:

$$vIR = fd/(fS - FL),$$

in which
   fd denotes focal length of the entire diffraction optical system at d-line of 588 nm wavelength,
   fS denotes focal length of the entire diffraction optical system at the wavelength λS, and
   fL denotes focal length of the entire diffraction optical system at the wavelength λL.

2. The diffraction optical system according to claim 1, wherein
   the following conditional expression (2) is satisfied:

$$1.0 \times 10^{-7} < \phi m/\phi \quad (2)$$

where φm denotes refractive power of the diffractive optical surface and φ denotes refractive power of the entire diffraction optical system.

3. The diffraction optical system according to claim 1, wherein
   the following conditional expression (3) is satisfied:

$$h/\lambda d < 100.0 \quad (3)$$

where h denotes a grating height of the diffractive optical surface, and λd denotes the wavelength of d-line.

4. The diffraction optical system according to claim 1, wherein
   the wavelength λS is the g-line of 436 nm wavelength and the wavelength λL is the s-line of 852 nm wavelength.

5. The diffraction optical system according to claim 1, wherein
   the wavelength λS is the g-line of 436 nm wavelength and the wavelength λL is the t-line of 1014 nm wavelength.

6. The diffraction optical system according to claim 1, wherein
   the following conditional expression (5) is satisfied:

$$0.8 < (Eg + EC)/(2 \times Ed) \quad (5)$$

where Ed, Eg and EC denote diffraction efficiency design values for the diffractive optical element with respect to the d-line, g-line and C-line respectively.

7. The diffraction optical system according to claim 1, wherein the plurality of diffractive element members is constituted by a first diffraction grating element and a second diffraction grating element, one of a constituent material of the first diffraction grating element and a constituent material of the second diffraction grating element is a high refractive index–low dispersion material and the other is a low refractive index–high dispersion material, and the following conditional expression (6) is satisfied:

$$-20.0 < \Delta Nd/\Delta(NF-NC) < -2.0 \quad (6)$$

where $\Delta(NF-NC)$ denotes a difference of primary dispersion (NF-NC) between the high refractive index–low dispersion material and the low refractive index–high dispersion material.

8. The diffraction optical system according to claim 1, wherein the following conditional expression (7) is satisfied:

$$0.5 < \Delta gs/\Delta FC < 8.0 \quad (7)$$

where $\Delta gs$ denotes a difference between a focal length at the g-line and a focal length at the s-line, and $\Delta FC$ denotes a difference between a focal length at the F-line and a focal length at the C-line.

9. An image capturing device, comprising:

the diffraction optical system according to claim 1; and an imaging device that captures an object image formed on an imaging surface by the diffraction optical system.

10. The diffraction optical system according to claim 1, wherein the following conditional expression (1-1) being satisfied:

$$0.10 < (\Delta Ng + \Delta Ns)/2 < 0.20 \quad (1\text{-}1).$$

11. The diffraction optical system according to claim 1, wherein the following conditional expression (4-1) being also satisfied:

$$70.0 < |\nu IR| \quad (4\text{-}1).$$

12. The diffraction optical system according to claim 1, wherein the multilayer diffractive optical element is placed inside the prism.

13. The diffraction optical system according to claim 1, wherein a plane glass plate is placed in front of an incident surface of the prism, and the multilayer diffractive optical element is placed on a surface of the plane glass plate which faces to the incident surface of the prism.

14. The diffraction optical system according to claim 1, wherein the multilayer diffractive optical element is formed of a first optical element member and a second optical element member having diffraction gratings made of different materials, and the heights of the diffraction gratings of the first and the second optical elements are the same.

15. A diffraction optical system, comprising:

a prism having a free curve surface which is a rotationally asymmetric aspherical surface, a multilayer diffractive optical element in which a plurality of diffractive element members are laminated together, and a diffractive optical surface having a grating structure is formed at an interface of the plurality of diffractive element members, an imaging device that captures an object image formed on an imaging surface by the diffraction optical system, and the following conditional expression (1) being satisfied:

$$0.005 < (\Delta Ng + \Delta Ns)/2 < 0.20 \quad (1)$$

where $\Delta Ng$ denotes a refractive index difference at g-line of 436 nm wavelength on the diffractive optical surface, and $\Delta Ns$ denotes a refractive index difference at s-line of 852 nm wavelength on the diffractive optical surface.

* * * * *